3,424,071
Patented Jan. 28, 1969

3,424,071
PHOTOGRAPHIC CAMERA WITH SELECTIVELY ATTACHABLE FLASH UNITS
Josef Schwahn, Stuttgart, Germany, assignor to Zeiss-Ikon Aktiengesellschaft, Stuttgart, Germany, a corporation of Germany
Filed Mar. 9, 1966, Ser. No. 532,986
Claims priority, application Germany, Mar. 12, 1965, Z 11,402
U.S. Cl. 95—11.5                3 Claims
Int. Cl. G03b 9/70

ABSTRACT OF THE DISCLOSURE

A photographic camera having shutter operated synchronous contacts is detachably connectable either with an electronic flash unit or with a flash bulb unit. A test lamp—indicating whether the flash unit is operative—is arranged in parallel to the shutter operated synchronous contacts and to the electrical connectors on the camera which are detachably connectable with matching electrical connectors on the selectively employable flash units.

---

Figure 1:
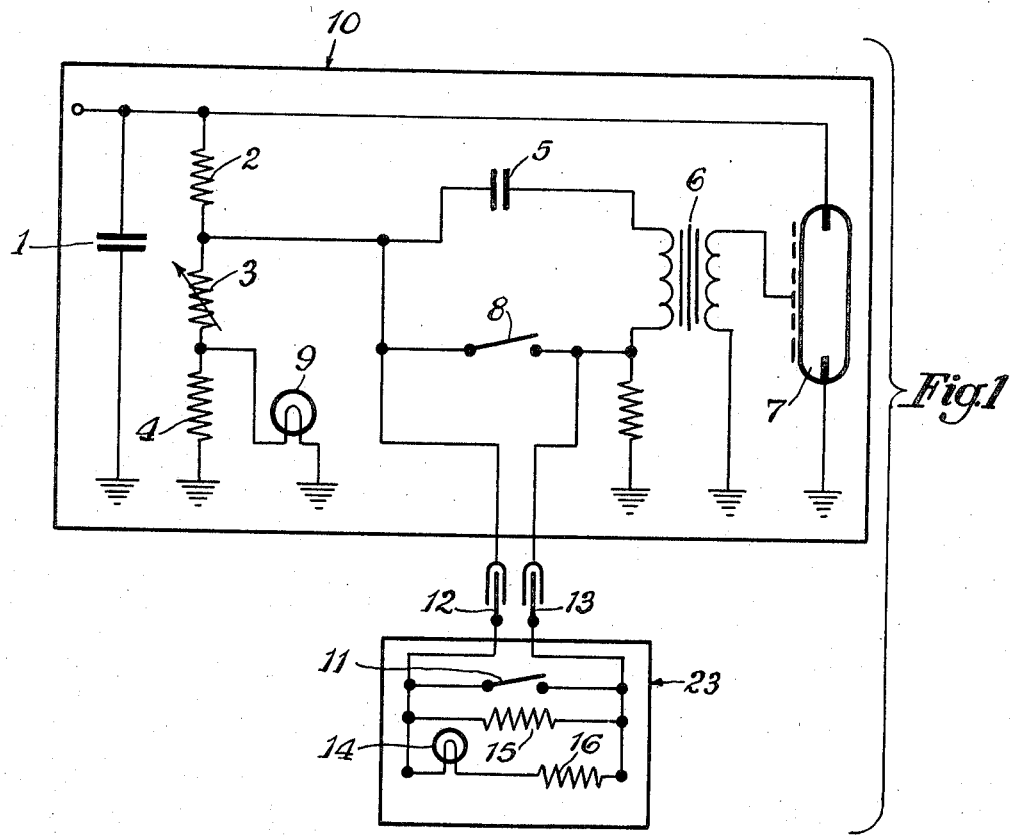

This invention relates to a photographic camera having provisions for attaching a flash unit, particularly an electronic flash unit which may be caused to flash by contact means synchronized with the camera shutter.

In electronic flash units it is customary to indicate the readiness for a flash action by a built-in test lamp which lights up as soon as the charge of the unit's capacitor has reached the required potential. Such indication of the state of charge of the storage capacitor is necessary, because after switching on of the unit or after a flash release, it takes a certain length of time for recharging the capacitor. It has been found to be convenient and also of advantage to indicate the readiness for a flash not only on the flash unit itself but also on the photographic camera and here preferably in the viewing area of the view finder. To achieve this advantage, it has been proposed heretofore to deflect the light of the test lamp in the flash unit by optical means into the line of vision of the view finder in such a way that a lighting up of the lamp can be immediately noticed by the camera user while focusing on the subject to be photographed. Moreover, an arrangement has also been disclosed in the same copending application wherein a pilot lamp is arranged in the view finder, and this lamp, by suitable contacts, becomes connected in parallel with the test lamp in the flash unit at the instant the latter is attached to the camera. When so arranged, both lamps will light up simultaneously when the capacitor reaches its full charge. Both solutions have their drawbacks. In the first case, the camera housing must be provided with a hole for passing the light from the test lamp into the view finder and additional optical means must be provided; in the latter case, electrical connections between flash unit and camera must be made, preferably through attachment means on flash unit and camera.

It is an object of the present invention to obviate the shortcomings pointed out above by utilizing for flash readiness indication in the camera the same electrical connection as used for the synchronized contact means at the camera shutter and as provided in any camera intended for flash photography. At the synchronized contacts, there prevails, when the electronic flash unit is connected, a potential proportional to the potential of the storage capacitor of the flash unit, and this potential, according to this invention, is utilized for the purpose of the present invention.

The additional provisions of optical and/or electrical means for indicating a fully charged flash capacitor in the view field of the camera become unnecessary when, as disclosed in the present invention, a suitable second test lamp is arranged in or on the camera that is adapted to light up under the influence of the flash unit capacitor potential while connected across the shutter-synchronized contacts in the camera, whereby for adaptation, resistors may be connected in series and/or in parallel to this second test lamp. It is advisable to arrange this additional test lamp in the light channel of the view finder so that its lighting-up becomes noticeable when looking into the view finder. In accordance with this invention it is nonessential in which manner the capacitor potential is carried to the synchronized contacts, it may be by conductors outside the camera to the flash unit or through contact-making elements accommodated in the flash unit base and its mount on the camera. A primary advantage of the present invention is that for energizing the second test lamp, only the electrical connections between the flash unit and camera are used that are anyhow required for the flash release but no additional ones.

Under certain conditions it may be advisable to interrupt the circuit of the camera-arranged test lamp and render it inoperative when not actually used. The switch for temporarily closing the circuit is actuated preferably dependently in advance of camera release so as to allow a check of the test lamp and in turn of the capacitor charge shortly before taking a picture with flash light.

The switch for opening and closing the test lamp circuit can be combined, as proposed in another embodiment of this invention, with the camera release in that this release functions in two steps, first closing the circuit and making possible a last check on the readiness of the flash unit by observing lighting-up of the test lamp, and subsequently releasing the shutter. The switch, of course, will open the circuit again after the shutter has been released.

Figure 2:
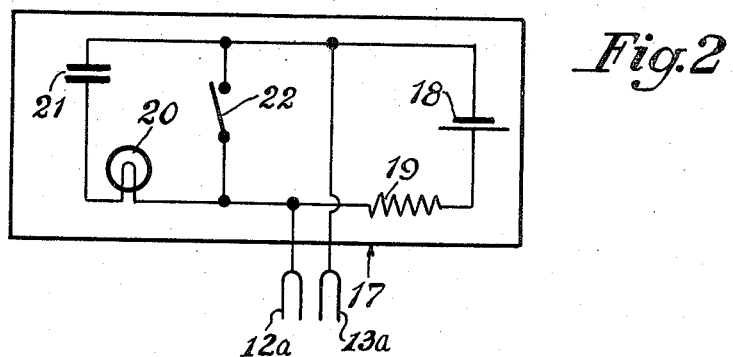
Figure 3:
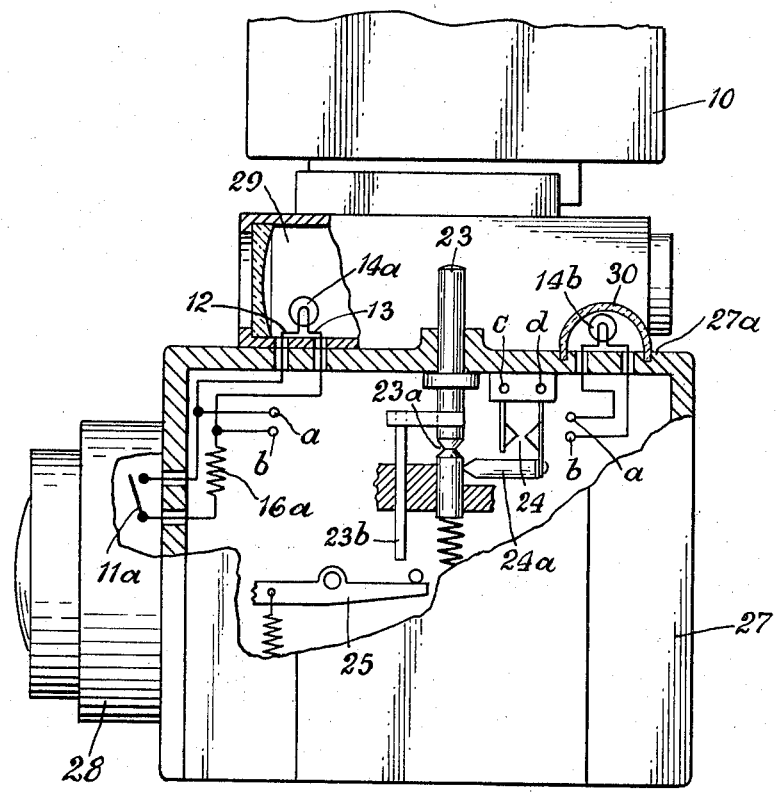

In the accompanying drawings:
FIG. 1 is a diagrammatic illustration of the circuits and components of an electronic flash unit combined with a camera;
FIG. 2 illustrates a flash bulb unit adapted to be detachably connected with the camera illustrated in FIG 1; and
FIG. 3 illustrates diagrammatically a camera with a flash unit attached thereto and a few possible arrangements of the test lamp and control circuits therefor.

Referring first to FIG. 1, the series-connected resistors 2, 3 and 4 are arranged in parallel to the storage capacitor 1. The ignition or firing voltage for the capacitor 5 is tapped off at one of these resistors. The ignition capacitor 5 is connected with the ignition electrode of the electronic discharge lamp or flash tube 7 by means of transformer 6. The switch 8 on the flash unit is destined to close the circuit for the discharge of the ignition capacitor 5 through the primary winding of the transformer 6 and thereby cause firing of the flash unit. A test lamp 9 serves to indicate whether the storage capacitor 1 has been charged to a sufficient potential for a flash. When the electronic flash unit, as indicated by its outline 10, is attached to the camera or connected therewith by any known means, the synchronized contacts 11 are connected with the circuit of the flash unit. The contacts 11 are arranged in the camera shutter forming a part of the camera indicated by the rectangular outline 23. These contacts 11 take over the function of the switch 8. It will be noted that through electrical connectors 12 and 13, the contacts 11 lie now in parallel with the switch 8 and receive the potential of the capacitor 5. An incandescent lamp 14 in shunt connection with the contacts 11 will light up when the storage capacitor 1 is fully charged, because the charge of ignition capacitor 5 is in direct proportion to the charge of the storage capacitor owing to the fact that its charging voltage is tapped off at a resistor parallel to the storage capacitor. This test lamp 14, of course, may be arranged in any suitable location on the camera where it can be readily observed, however the best position is within the view finder where the firing readiness of the flash unit can be instantly spotted by the observer while viewing a subject.

In the event that a bulb flash unit, as indicated by outline 17 of FIG. 2, is used for taking flash pictures, the battery 18 of the bulb flash unit will charge the capacitor 21 through resistor 19 and the flash bulb 20. Firing of the flash bulb 20 is effected by closing a switch 22 which then will complete the discharge circuit of the capacitor 21 through the flash bulb 20 and in turn cause the flash in the latter. With the bulb flash unit attached to the camera, and the connectors 12a and 13a connected to the connectors 12 and 13, the synchronized contacts 11 of the camera shutter will lie in parallel with the switch 22 in the bulb flash unit. The cooperating components of the circuits, accommodated in the camera, indicated by outline in FIG. 1, are arranged so that the camera can be used either with the electronic flash unit of FIG. 1 or with the bulb flash unit of FIG. 2. When working with a bulb flash lamp instead of with an electronic flash unit, the potential of capacitor 21 will become effective at the test lamp 14 and this lamp must be correspondingly selected for an operating voltage in the range of that of capacitor 21 or of battery 18. In order to take a continuous load off of the battery 18 and the capacitor 21, it is advisable to interpose a switch in series with the test lamp 14 to be closed only momentarily whenever the firing readiness of the flash unit is to be checked. Excessive loading of capacitor 21 and battery 18 may also be prevented by employing a suitable resistor combination, such as resistors 15 and 16, in series and/or parallel connection with the test lamp 14.

For selective use of an electronic flash unit and bulb flash lamp on the same camera, it is advisable to connect in parallel to the synchronized contacts of the camera shutter, two test lamps of different operating voltage, each suitable for the respective flash device, and to provide switching means for switching on or off the lamps as required. When of advantage, it is of course possible to include the resistor combination, eventually associated with one or the other of the lamps, in this switching-over manipulation.

Referring to FIG. 3, the camera as a whole is designated with 27 and has on its top wall 27a a view finder 29 on which in turn is attached the flash unit 10. The electrical connectors 12 and 13 are arranged between the view finder and the camera, while a test lamp 14a is arranged in the view finder housing to be visible by the operator looking into the view finder. The synchronous contacts 11a in the shutter of the camera or in the camera objective 28 are arranged in parallel to the test lamp 14a. 16a designates a protective resistance for the test lamp 14a.

Instead of arranging the test lamp in the view finder, it may, as shown at 14b, also be arranged in or just above the top wall 27a of the camera casing 27 within a light transmitting hood 30 which makes the light of the test lamp clearly noticeable from the exterior of the camera. The connectors *a* and *b* of this test lamp 14b may be connected with conductive lines leading to the synchronous contacts 11a.

The camera release 23 is actuated in two successive steps. Upon the initial actuation the contacts 24 will be closed when the spring influenced contact carrier 24a enters a groove 23a in the release member 23, and upon a further depression of the member 23, a pivotally mounted lever 25 is actuated by a pin 23b on the member 23, so that the lever 25 releases the shutter having the synchronous contacts therein. The terminals of the contacts 24 are designated with *c* and *d*, and according to FIG. 1 are arranged between the test lamp 14 and the resistance 16, so that the test lamp regardless whether it is arranged in the view finder or in or above the top wall of the camera housing is energized only when the release member 23 has performed its first movement at which the carrier 24a engages the groove 23a. Therefore, one may determine prior to the release of the shutter whether the required voltage condition is available in the flash unit 10. In the nonactuated position of the camera release 23, as shown in FIG. 3, the test lamp is disconnected so that no current is consumed.

What I claim is:

1. The combination of a photographic camera having shutter operated synchronous contacts with a detachable flash unit, comprising a pair of electrical connectors on said camera, a pair of electrical connectors on said flash unit detachably connectable with said pair of electrical connectors on said camera, a source of electrical energy in said flash unit and connected with a flash lamp and with said electrical connectors on said flash unit, a test lamp and circuit means connecting said test lamp in parallel with said synchronous contacts and with said pair of electrical connectors on said camera, said circuit means including resistance means for adjusting the operating voltage of said test lamp to the one of said flash lamp in said flash unit, whereby said test lamp is adapted to be energized by said source of electrical energy in said flash unit only when the pair of connectors on said flash unit are connected with said pair of connectors on said camera.

2. The combination according to claim 1, including means for selectively connecting and disconnecting said test lamp in dependence of an operating means actuated prior to the release of the camera, said operating means comprising a multistep camera release device.

3. The combination according to claim 1, in which selectively an electronic flash unit and a flash bulb unit is attachable to said camera, and including two test lamps of different operating voltages in said camera and arranged to be in parallel to said synchronous contacts, one of said two test lamps being associated with one of said two flash units and the other test lamp being associated with the other flash unit.

References Cited

UNITED STATES PATENTS

| 2,508,242 | 5/1950 | Stein | 240—1.3 XR |
| 2,844,081 | 7/1958 | Wagner et al. | 95—11.5 |
| 2,971,432 | 2/1961 | Blank | 352—171 |
| 3,113,495 | 12/1963 | Brandt et al. | 95—11.5 |
| 3,288,044 | 11/1966 | Bramer | 95—11.5 |

NORTON ANSHER, *Primary Examiner.*

FRED L. BRAUN, *Assistant Examiner.*